United States Patent [19]
Chen

[11] Patent Number: 5,859,487
[45] Date of Patent: Jan. 12, 1999

[54] STATOR STRUCTURE OF MOTOR AND ITS FORMING METHOD

[75] Inventor: Lee-Long Chen, Taoyuan Hsien, Taiwan

[73] Assignee: Delta Electronics, Inc., Taoyuan Hsien, Taiwan

[21] Appl. No.: 866,534

[22] Filed: May 30, 1997

[51] Int. Cl.$^6$ ............................ H02K 1/12; H02K 21/22; H02K 15/02

[52] U.S. Cl. .............................. 310/254; 310/164; 310/42

[58] Field of Search ..................................... 310/216, 218, 310/254, 257, 162, 164, 42; 29/596

[56] References Cited

U.S. PATENT DOCUMENTS

| | | | |
|---|---|---|---|
| 1,990,678 | 2/1935 | Vaucher | 310/164 |
| 2,823,545 | 2/1958 | Bodge | 310/164 |
| 3,068,375 | 12/1962 | Kohlhagen | 310/164 |
| 3,241,111 | 3/1966 | Sandstrom | 310/42 |
| 3,560,775 | 2/1971 | Welter | 310/254 |
| 4,775,813 | 10/1988 | Janson | 310/257 |
| 5,093,599 | 3/1992 | Horng | 310/254 |
| 5,245,236 | 9/1993 | Horng | 310/91 |

*Primary Examiner*—Clayton LaBalle
*Attorney, Agent, or Firm*—Knobbe, Martens, Olson & Bear, LLP

[57] ABSTRACT

The stator structure for improving the efficiency of motor is described which includes: a) a ring; b) N pieces of upper salients spacedly connected to the ring and located on a first plane; c) N pieces of lower salients spaced at intervals and located on a second plane; d) N pieces of waist posts arranged between the first and second planes for forming a magnetically conductive path, wherein one end of each of the waist posts is connected to the ring within an interval between two adjacent upper salients and the other end is connected to a corresponding one of N pieces of lower salients located between two adjacent upper salients. Its forming method includes steps of: a) integrally forming a hollow cogged plate consisting of a first ring, N pieces of short and N pieces of long salients alternately connected to the first ring; and b) bending N pieces of long salients to form the stator structure having N pieces of waist posts, N pieces of upper salients, and N pieces of lower salients.

19 Claims, 6 Drawing Sheets

STATOR STRUCTURE OF MOTOR AND ITS FORMING METHOD

FIELD OF THE INVENTION

The present invention is related to the stator structure of a motor and the forming method for improving the yield rate and the efficiency of the motor.

BACKGROUND OF THE INVENTION

The conventional stator structure of motor has defects of magnetic leakage phenomenon and inaccurate positions of upper and lower poles. Please refer to FIG. 1 showing a stator of a prior art. The stator consists of piled silicon steel sheets 101 and the arms of silicon steel sheets are T-shaped that four groups of coils are twined around them. The costs for the stator and twining coils are very expensive.

In order to improve the defects described above, a scheme of forming poles by using a pair of coils had been adopted. Please refer to FIG. 2 which includes two pole layers (upper and lower) 201, a magnetically conductive cylinder 203 and a pair of coils 202. Two ends of the magnetically conductive cylinder 203 is tightly engaged with the hollow of two pole layers 201 having a insulator therebetween. The insulator is twined by a pair of coils 202. During engaged process, two pole layers are positioned which is complementary to each other in order that every pole is well distributed in a ring by a mechanical angle. In spite of its low cost, the scheme is not good enough because a crack 204 generated therewith will influence the magnetic conduction.

In order to avoid a crack which may affect the magnetic conduction and to avoid the need of matching the upper and lower pole layer, it is necessary to make a simple and stable stator for improving the efficiency of the motor.

SUMMARY OF THE INVENTION

An object of the present invention is to provide a stator structure for inproving the efficiency of a motor. The stator structure includes: a) a ring; b) N pieces of upper salients spacedly connected to the ring and located on a first plane; c) N pieces of lower salients spaced at intervals and located on a second plane; d) N pieces of waist posts arranged between the first and second planes for forming a magnetically conductive path, wherein one end of each of the waist posts is connected to the ring within an interval between two adjacent upper salients and the other end is connected to a corresponding one of N pieces of lower salients located between two adjacent upper salients; wherein N is an integer greater than 1.

In accordance with one aspect of the present invention, the stator structure is integrally formed by a magnetically conductive material.

In accordance with another aspect of the present invention, the magnetically conductive material is a silicon steel sheet.

Another object of the present invention is to provide a stator for improving the efficiency of a motor. The stator includes: a) a ring; b) N pieces of upper salients spacedly connected to the ring and located on a first plane; c) N pieces of lower salients spaced at intervals and located on a second plane; d) N pieces of waist posts arranged between the first and second planes for forming a magnetically conductive path, wherein one end of each of the waist posts is connected to the ring within an interval between two adjacent upper salients and the other end is connected to a corresponding one of N pieces of lower salients located between two adjacent upper salients; e) a pair of coils twining around the waist posts; f) an insulator sheathed on N pieces of upper and lower salients and N pieces of waist posts for prohibiting the contact of a pair of coils with the stator structure; g) a circuit board positioned under N pieces of lower salients; and h) a stator bracket engaged with the ring for securing the stator structure thereon; wherein N is an integer greater than 1.

In accordance with one aspect of the present invention, the insulator is made of plastic.

In accordance with another aspect of the present invention, there is an electric circuit on the circuit board for detecting and controlling a magnetic field generated by the stator.

In accordance with another aspect of the present invention, the circuit board is a hollow plate.

In accordance with another aspect of the present invention, the stator bracket includes a support and a cylinder which protrudes from the center of the support and passes through the ring and the hollow plate.

In accordance with another aspect of the present invention, the support is electrically insulated.

In accordance with another aspect of the present invention, the support is made of plastic.

In accordance with another aspect of the present invention, the cylinder is made of a non-magnetically conductive material.

In accordance with another aspect of the present invention, the non-magnetically conductive material is one selected from a group consisting of copper and plastic.

In accordance with another aspect of the present invention, further including a second identical stator structure engaged with the stator structure by inverting the second stator structure to have each of lower salients engaged with each of upper salients, respectively.

In accordance with another aspect of the present invention, further including at least one pair of a plural silicon steel sheets, each of which has the same configuration as that constituted by N pieces of upper salients and the ring, one of a pair of the plural silicon sheets being piled above the stator structure and the other one being piled below the second stator structure.

In accordance with another aspect of the present invention, further comprising at least one pair of a plural silicon steel sheets, each of which has the same configuration as that constituted by N pieces of upper salients and the ring, one of a pair of the plural silicon sheets being piled above the stator structure and the other one being piled below the stator structure.

Another object of the present invention is to provide a method for forming a stator structure. The method includes steps of: a) integrally forming a hollow cogged plate consisting of a first ring, N pieces of short and N pieces of long salients alternately connected to the first ring; and b) bending N pieces of long salients to form the stator structure having N pieces of waist posts, N pieces of upper salients, and N pieces of lower salients; wherein N is an integer greater than 1.

In accordance with one aspect of the present invention, the hollow cogged plate is made of a magnetically conductive material.

In accordance with another aspect of the present invention, the magnetically conductive material is silicon steel.

In accordance with another aspect of the present invention, a length difference between one of N pieces of long salients and one of N pieces of short salients is a length of one of N pieces of waist posts.

The present invention may best be understood through the following description with reference to the accompanying drawings, in which:

DETAILED DESCRIPTION OF THE PREFERRED EMBODIMENT

Figure 1:
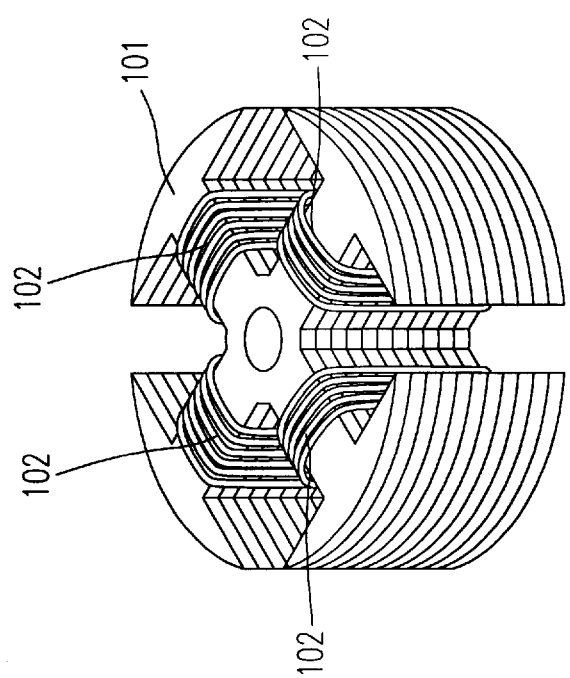
FIG. 1 is a conventional stack stator.
Figure 2:
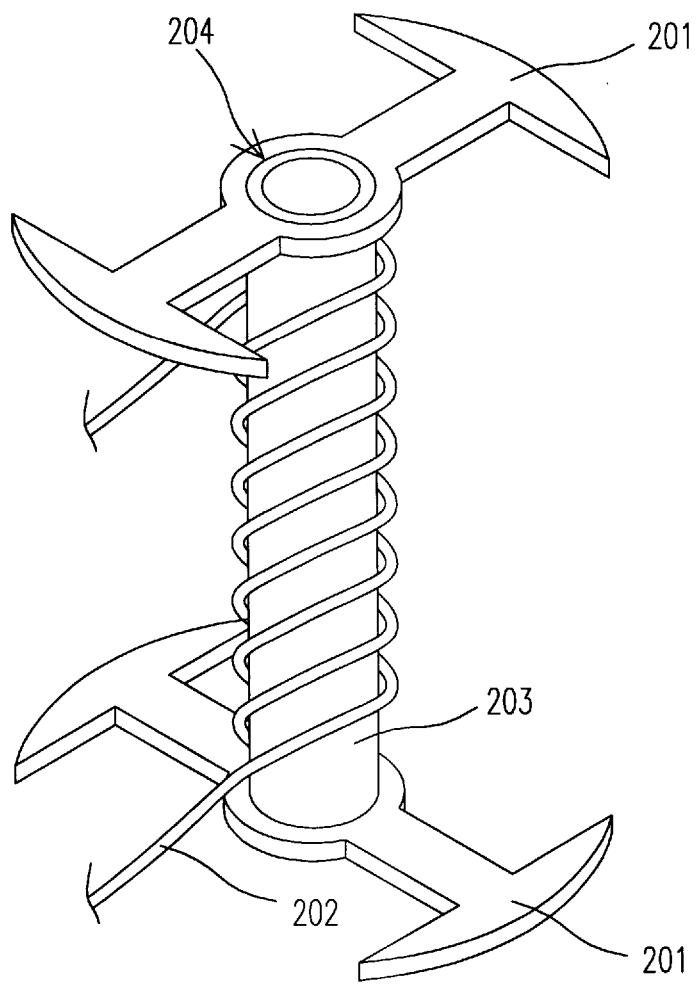
FIG. 2 is the conventional stator with a pair of coils and multi-poles.
Figure 3:
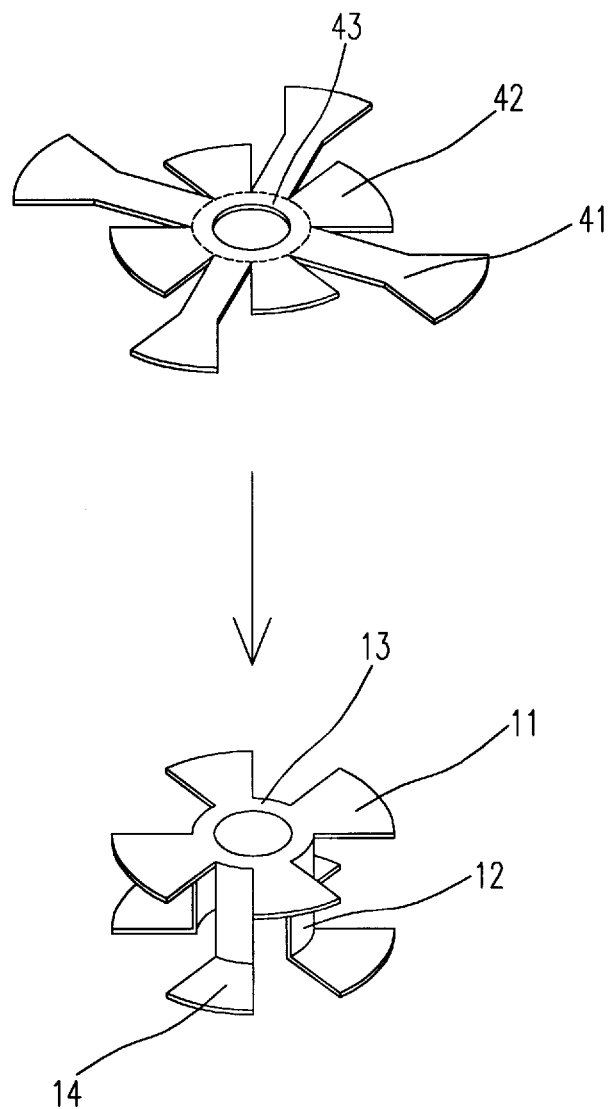
FIG. 3 is a preferred embodiment of method for forming a stator structure.

Please refer to FIG. 3 showing a method for forming a stator structure of the present invention. The stator structure is integrally formed by a hollow cogged plate made of silicon steel. The hollow cogged plate has four pieces of short salients 42 and four pieces of long salients 41, both of which are alternately connected to the first ring 43. Four pieces of long salients 41 are bended for forming the stator structure which has four pieces of waist posts 12, four pieces of upper salients 11, four pieces of lower salients 14, and a ring 13. Because the stator structure is integrally formed, it is easy to manufacture. Furthermore, the stator thus formed has such an accurate pole position that there can be a high yield rate with the motor.

Figure 4:
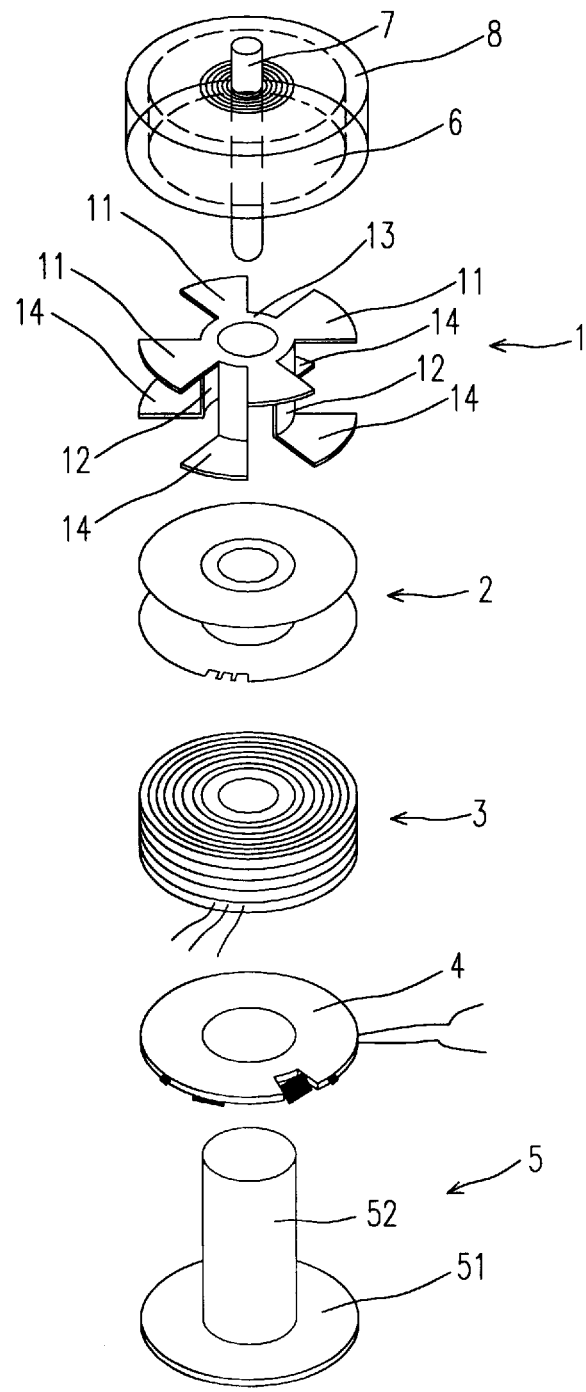
FIG. 4 is the first preferred embodiment of a stator of a motor.

Please refer to FIG. 4 which shows a decomposed diagram of direct current motor. It includes a stator structure 1, an insulator 2, a pair of coils 3, a circuit board 4, a stator bracket 5, and a rotor 6. The stator structure 1, integrally formed by a silicon steel sheet, consists of four pieces of waist posts 12, four pieces of upper salients 11, four pieces of lower salients 14, and a ring 13. Before twined by a pair of coils 3, the insulator 2 is sheathed on upper and lower salients (11 and 14) and waist posts 12. The insulator 2 can be formed by the ejection of plastic and then integrated together with the stator structure 1. Thereafter, a circuit board 4 is positioned under lower salients 14. The circuit board 4 includes Hall device and control circuit to detect and control the magnetic field of the stator, respectively. Thenceforth, the stator bracket 5 is engaged with the ring 13. The stator bracket 5 includes a support 51 and a cylinder 52 which protrudes from the center of the support 51 and passes through the ring 13 and the hollow of circuit board 4 for securing the stator structure 1 thereon. Finally, the mandrel 7 of rotor 6 is engaged in the cylinder 52 of the stator bracket 5. Because upper salients 11, lower salients 14 and waist posts 12 are integrally connected, there is no magnetic leakage generated in the magnetically conductive path. The motor can rotate by taking advantage of magnet 8 of rotor 6 and the change of the magnetic field of the stator.

Figure 5:
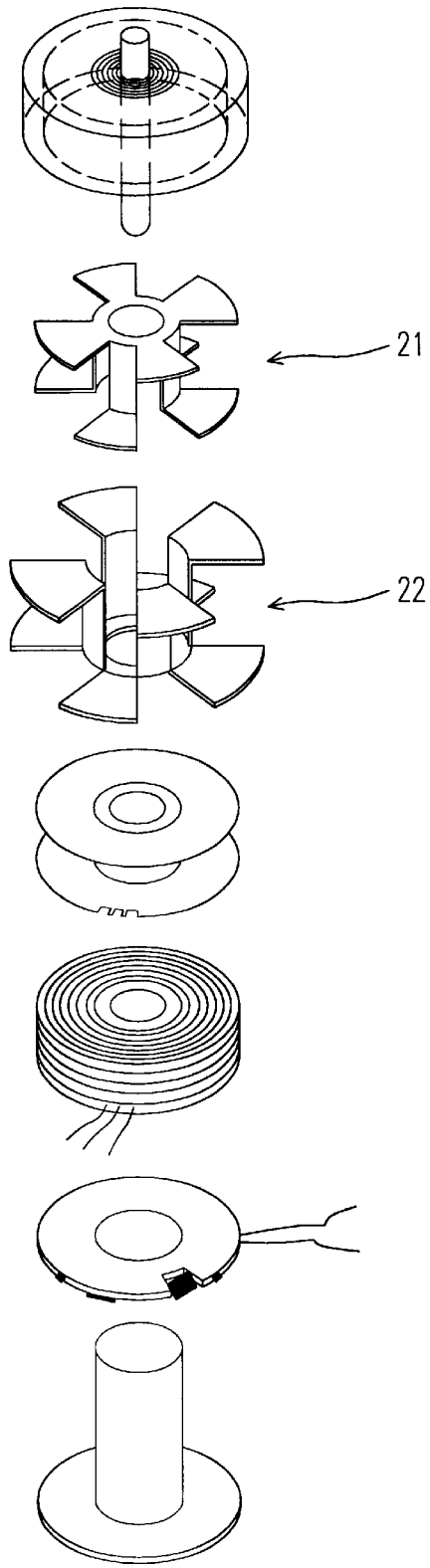
FIG. 5 is the second preferred embodiment of a stator of a motor.

FIG. 5 is similar to FIG. 4. The major difference is that two stator structures 21 and 22 in this figure are engaged together to increase area of magnetic conduction for improving the horsepower of the motor. It is to be noted that a stator structure 21 is engaged with another stator structure 22 by inversion and intersection. The cross-angle is 45°.

Figure 6:
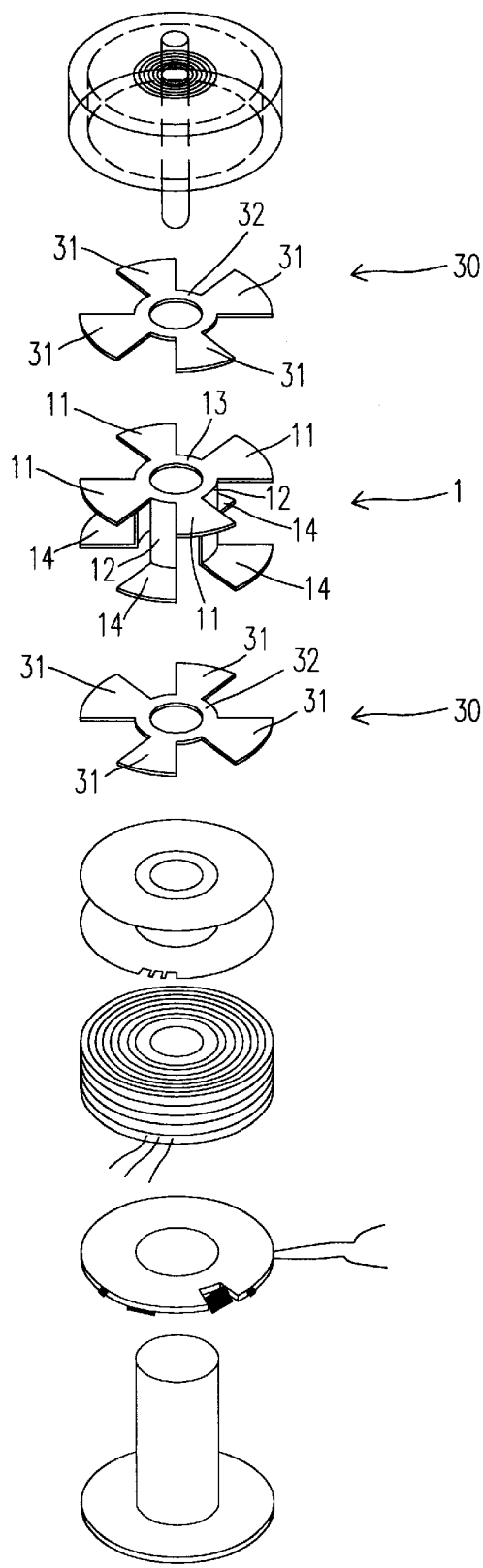
FIG. 6 is the third preferred embodiment of a stator of a motor.

In FIG. 6, two silicon steel sheets are piled above and below the stator structure 1 respectively in response to an increase in area of magnetic conduction to improve the horsepower of the motor. Every silicon steel sheet consists of four salients 31 and a second ring 32. Certainly, a plurality of silicon steel sheets can also be piled above and below the stator structure 1. The same configuration can be applied in the stator structure of FIG. 5.

In conclusion, the stator structure of the present invention is integrally formed by pressing process in order to improve the defects of the conventional stator that the stator structure need to be engaged in the cylinder and the upper and lower poles have to complementarily match each other. In order to enhance the horsepower of motor, a plurality of silicon steel sheets are piled above and below the stator structure or two stator structures which are crossed and piled together by inversion. By improving the defects of conventional stator, the present invention provides a stator which can be easily fabricated for providing a motor with high yield rate and high operating efficiency.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A stator structure comprising:

a ring;

N pieces of unbent first salients spacedly connected to said ring and located on a first plane to serve as upper salients; and N pieces of second salients longer than said first salients and bent to form N pieces of lower salients and N pieces of waist posts, wherein said N pieces of lower salients are spaced at intervals and located on a second plane, and said N pieces of waist posts are arranged between said first and second planes for forming a magnetically conductive path, wherein one end of each of said waist posts is connected to said ring within an interval between two adjacent upper salients and the other end of each of said waist posts is connected to a corresponding one of said N pieces of lower salients located between said two adjacent upper salients, said upper and lower salients being separated by a distance along an axial direction of said waist posts sufficient to prevent magnetic leakage from occurring between said upper and lower salients; and wherein N is an integer greater than 1.

2. A stator structure as claimed in claim 1, wherein said stator structure is integrally formed by a magnetically conductive material.

3. A stator structure as claimed in claim 2, wherein said magnetically conductive material is a silicon steel sheet.

4. A stator comprising:

a ring;

N pieces of unbent first salients spacedly connected to said ring and located on a first plane to serve as upper salients; and N pieces of second salients longer than said first salients and bent to form N pieces of lower salients and N pieces of waist posts, said N pieces of lower salients being spaced at intervals and located on a second plane, said N pieces of waist posts being arranged between said first and second planes for forming a magnetically conductive path, wherein one end of each of said waist posts is connected to said ring within an interval between two adjacent upper salients and the other end is connected to a corresponding one of said N pieces of lower salients located between said two adjacent upper salients, said upper and lower salients being separated by a distance along an axial direction of said waist posts sufficient to reduce magnetic leakage between said upper and lower salients;

a pair of coils twining around said waist posts and positioned so that a line passing radially outward through said coils and perpendicular to said axial direction of said waist posts does not intersect said first or second salients;

an insulator sheathed on said N pieces of upper and lower salients and said N pieces of waist posts for prohibiting the contact of said pair of coils with said stator structure;

a circuit board positioned under said N pieces of lower salients; and a stator bracket engaged with said ring for securing said stator structure thereon;

wherein N is an integer greater than 1.

5. A stator as claimed in claim 4, wherein said insulator is made of plastic.

6. A stator as claimed in claim 4, wherein there is an electric circuit on said circuit board for detecting and controlling a magnetic field generated by said stator.

7. A stator as claimed in claim 6, wherein said circuit board is a hollow plate.

8. A stator as claimed in claim 7, wherein said stator bracket includes a support and a cylinder which protrudes from the center of said support and passes through said ring and said hollow plate.

9. A stator as claimed in claim 8, wherein said support is electrically insulated.

10. A stator as claimed in claim 9, wherein said support is made of plastic.

11. A stator as claimed in claim 8, wherein said cylinder is made of a non-magnetically conductive material.

12. A stator as claimed in claim 11, wherein said non-magnetically conductive material is one selected from a group consisting of copper and plastic.

13. A stator as claimed in claim 4, further comprising a second identical stator structure engaged with said stator structure by inverting said second stator structure to have each of lower salients engaged with each of upper salients, respectively.

14. A stator as claimed in claim 13, further comprising at least one pair of a plural silicon steel sheets, each of which has the same configuration as that constituted by said N pieces of upper salients and said ring, one of said pair of said plural silicon sheets being piled above said stator structure and the other one being piled below said second stator structure.

15. A stator as claimed in claim 4, further comprising at least one pair of a plural silicon steel sheets, each of which has the same configuration as that constituted by said N pieces of upper salients and said ring, one of said pair of said plural silicon sheets being piled above said stator structure and the other one being piled below said stator structure.

16. A method for forming a stator structure comprising the steps of:

(a) integrally forming a hollow cogged plate consisting of a first ring, N pieces of short, and N pieces of long salients alternately connected to said first ring; and (b) bending said N pieces of long salients to form said stator structure having N pieces of waist posts, N pieces of lower salients, and N pieces of upper unbent salients, wherein said lower and upper salients are separated by a distance along an axial direction of said waist posts sufficient to reduce magnetic leakage between said lower and upper salients;

wherein N is an integer greater than 1.

17. A method as claimed in claim 16, wherein said hollow cogged plate is made of a magnetically conductive material.

18. A method as claimed in claim 17, wherein said magnetically conductive material is silicon steel.

19. A method as claimed in claim 16, wherein a length difference between one of said N pieces of long salients and one of said N pieces of short salients is a length of one of said N pieces of waist posts.

* * * * *